United States Patent [19]

Readman et al.

[11] Patent Number: 4,772,245
[45] Date of Patent: Sep. 20, 1988

[54] TORQUE TRANSMITTING ELASTOMERIC SHAFT COUPLING WITH SPLINE BACKUP

[75] Inventors: John Readman; Philip Zeiser, both of Rockford, Ill.

[73] Assignee: Sundstrand Corportion, Rockford, Ill.

[21] Appl. No.: 71,446

[22] Filed: Jul. 9, 1987

[51] Int. Cl.⁴ .............................. F16D 3/10; F16D 3/76
[52] U.S. Cl. ........................................ 464/89; 464/160
[58] Field of Search ...................... 464/87, 89, 90, 91, 464/92, 99, 106, 147, 150, 160

[56] References Cited

U.S. PATENT DOCUMENTS

| | | | |
|---|---|---|---|
| 2,491,734 | 12/1949 | Hirst | 464/90 |
| 2,556,624 | 6/1951 | MacBeth et al. | 464/92 |
| 2,822,676 | 2/1958 | Horovitz | 464/89 |
| 3,320,771 | 5/1967 | Roethlisberger et al. | 464/91 |
| 3,428,155 | 2/1969 | Binder et al. | 464/92 X |
| 3,503,224 | 3/1970 | Davidescu | 464/91 X |
| 4,236,737 | 12/1980 | Herbert et al. | 464/89 X |
| 4,482,335 | 11/1984 | Goody | 464/99 X |

FOREIGN PATENT DOCUMENTS 2152190  7/1985  United Kingdom ................. 464/68

*Primary Examiner*—Daniel P. Stodola
*Attorney, Agent, or Firm*—William D. Lanyi

[57] ABSTRACT

A shaft coupling apparatus connects first and second rotatable members by a compliant connecting component disposed radially between portions of the first and second rotatable members. A spline arrangement is also provided for the purpose of transmitting torque between the first and second rotatable members when the magnitude of torque between these members exceeds a predefined magnitude. The spline arrangement and the compliant connecting component are disposed in axial alignment for the purpose of permitting a degree of articulation to occur between the first and second rotatable members. When transmitting torque is below the predefined value, all of the torque is transmitted from the first rotatable member to the second rotatable member through the compliant connecting component which can be any resilient material, such as an elastomeric material. When the torque being transmitted exceeds the predefined value, teeth of a first spline member move into contact with teeth of a second spline member for the purpose of sharing the torque transmitting function and, for all magnitudes of torque above the predefined value, the torque is shared between the spline arrangement and the compliant connecting component.

7 Claims, 4 Drawing Sheets

TORQUE TRANSMITTING ELASTOMERIC SHAFT COUPLING WITH SPLINE BACKUP

BACKGROUND OF THE INVENTION

1. Field of the Invention

The present invention relates generally to a shaft coupling and, more particularly to a shaft coupling which comprises an elastomeric member in combination with a spline arrangement for transmitting torque between a drive shaft and an output shaft.

2. Description of the Related Art

Many different types of shaft couplings are known to those skilled in the art. It is sometimes beneficial to provide a compliant, or resilient, member between a drive shaft and an output shaft for the purpose of dampening vibration, reducing noise transmission through the coupling or permitting an articulation of the coupling arrangement. When a compliant or resilient member is used in this manner, it is well recognized that the compliant member does not possess the magnitude of strength that a metalic member can provide. Therefore, failure of the compliant member is possible. For this reason, a non-resilient device is sometimes used to provide a failsafe torque transmission component for use when, and if, the compliant member fails.

U.S. Pat. No. 4,406,640, which issued to Franklin et al on Sept. 27, 1983 discloses a drive axle assembly which comprises a drive shaft with an integral flange at one end and a second drive shaft with an integral hollow head at an end adjacent to the flange of the drive shaft. The flange and head are provided with cooperating lugs that form a lost motion positive drive device between the shafts. The drive axle assembly also includes a torsional damper that comprises a shell welded to the flange, a canister welded to the head and a pair of rubber bushings compressed between the shell and the canister. This assembly has an internal spacer to maintain longitudinal alignment of the shafts and a failsafe feature which retains the shafts together in the event the rubber bushings fail.

U.S. Pat. No. 4,516,956, which issued to Staiert on May 14, 1985, discloses a weld joint structure for an elastomeric flexible coupling. The weld joint structure is provided for a flexible coupling which has an inner hub, an outer cup and an elastomeric ring for torsional vibration protection of a drive train. The outer cup defines an integral radially inwardly disposed tubular portion which has an internal seat and an adapter member of different ferris material composition has an external seat that is connected to the cup by an annular weld joint. Although the device disclosed in this patent is primarily concerned with a weld joint structure, it shows the use of an elastomeric member which has an annular shape for connecting one shaft to another. It also shows the use of a spline arrangement to provide connection between one of the shafts and a member which is attached to that shaft, through the spline arrangement, and to a portion of the annular elastomeric member.

U.S. Pat. No. 2,154,077, which issued to Sampson on Apr. 11, 1939, discloses a universal joint assembly which includes a compliant connection between first and second portions of a coupling. This patent shows an elastomeric member disposed radially between a portion of a first rotatable member and a portion of a second rotatable member. A rubber ring is interposed between a pair of concentric driving and driven members for action in torsion in transmitting rotation between the coupled parts while yielding under stress to accommodate misalignment and relative axial and angular displacement of the shafts during operation.

Copending patent application Ser. No. 071,244 which was filed by Zeiser et al on July 9, 1987, discloses a concentric elastomeric shaft coupling for use with dual shafts that are disposed in coaxial and concentric relation with each other. The invention described in this copending application utilizes an elastomeric torque transmitting member in conjunction with a spline arrangement which is configured to transmit torque when the compliant member deforms and relative rotation occurs between the input and output shafts of either an inner drive arrangement or an outer drive arrangement. This deformation occurs when the magnitude of torque between input and output shafts exceeds a predetermined value. The spline arrangement disclosed in this copending patent application also serves to provide a failsafe torque transmitting component which is operative in the event that the compliant member fails during operation.

SUMMARY OF THE INVENTION

The present invention provides a shaft coupling that includes first and second rotatable members. Both the first and second rotatable members have axes of rotation which, under normal operation, are aligned coaxially with each other with the first and second rotatable members rotating about the same axis of rotation. A compliant member is provided as a means for connecting the first and second rotatable members to each other, with this compliant connecting means being configured to transmit torque between the first and second rotatable members.

The present invention provides a first spline member connected to the first rotatable member and a second spline member connected to the second rotatable member. During operation, when little or no torque is being transmitted between the first and second rotatable members, the first and second spline members are associated in non-torque transmitting relation with a plurality of teeth of the first spline member being disposed in the interstices of a plurality of teeth of the second spline member. The teeth of the first spline member are configured to be movable into contact with the teeth of the second spline member when the compliant connecting means is deformed in response to the occurrence of relative rotation between the first rotatable member and the second rotatable member. In a shaft coupling made in accordance with the present invention, the compliant connecting means is disposed in generally axial alignment with both the first and second spline members. The axial alignment between the compliant connecting means and the first and second spline members provides a degree of articulation between shafts which are connected to the first and second rotatable members.

In a preferred embodiment of the present invention, the compliant connecting means is made of an elastomeric material and is disposed radially between a portion of the first rotatable member and a portion of the second rotatable member. The compliant connecting means can be made of many different types of elastomeric material, but in a preferred embodiment of the present invention this elastomeric material is rubber. The articulation of the shaft coupling, described above, permits the first rotatable member to move relative to the second rotatable member in such a way that they rotate about individual axes of rotation which are not aligned coaxially with each other. Also, in a preferred embodiment of the present invention, the elastomeric material is selected and formed in such a way that relative rotation is permitted to occur between the first and second rotatable members upon the occurrence of a preselected magnitude of torque between these members. If the first rotatable member is connected to a drive shaft and the second rotatable member is connected to a driven shaft, the magnitude of torque existing between the two shafts will therefore determine the relative rotational position permitted to exist between the first and second rotatable members because of this deformation of the compliant connecting means. The first and second spline members are arranged so that their respective teeth are not in torque transmitting engagement until a specific degree of deformation exists within the compliant connecting means. In other words, the teeth of one of the spline members do not contact the teeth of the other spline member until a specific magnitude of relative rotation exists between the first and second rotatable members. This relative rotational position is caused by the deformation of the compliant member in response to a specific magnitude of torque existing between the first and second rotatable members or, in other words, a specific magnitude of torque existing between the drive shaft and the driven shaft The arrangement of the spline members is therefore used to define a certain magnitude of lost motion between the drive shaft and the driven shaft. This lost motion can be beneficially utilized in two ways. First, as described above, the compliant member can deform in response to the magnitude of torque existing between the first and second rotatable members and permit relative rotation to occur therebetween. Another way that the lost motion can be utilized is during the occurrence of a failure of the compliant member. If a catastrophic failure occurs within the compliant, or resilient, member of the present invention, the spline members act as a failsafe backup torque transmission device. During the failure of the compliant member, the two rotatable members move relative to each other until the spline member of one rotatable member contacts the spline member of the other rotatable member and provides a torque transmission between the drive shaft and the driven shaft. However, it should be understood that this type of operation is only expected to occur upon a complete failure of the compliant connecting means. Under normal operation, the compliant connecting means is intended to deform in a predefined manner in response to the magnitude of torque existing between the first and second rotatable members. Therefore, as the magnitude of this torque increases, the space between the teeth of the first and second spline members will gradually decrease until, at a predefined magnitude of torque, the teeth of the first spline member will move into contact with the teeth of the second spline member and torque will begin to be transmitted by the spline arrangement. If, after torque transmitting contact is achieved between the teeth of the first spline member and the teeth of the second spline member, the torque existing between the first and second rotatable members is decreased, the first spline member will move away from contact with the second spline member and torque will continue to be transmitted only through the compliant connecting means. Therefore, the present invention provides dual torque transmitting paths which are operable at different magnitudes of torque between the first and second rotatable members. At low magnitudes of torque, torque is transmitted only through the compliant connecting means of the present invention. At higher magnitudes of torque, torque is also transmitted through the spline arrangement which comprises the first and second spline members described above with the total torque being shared between the compliant connecting means and the spline arrangement.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Figure 1:
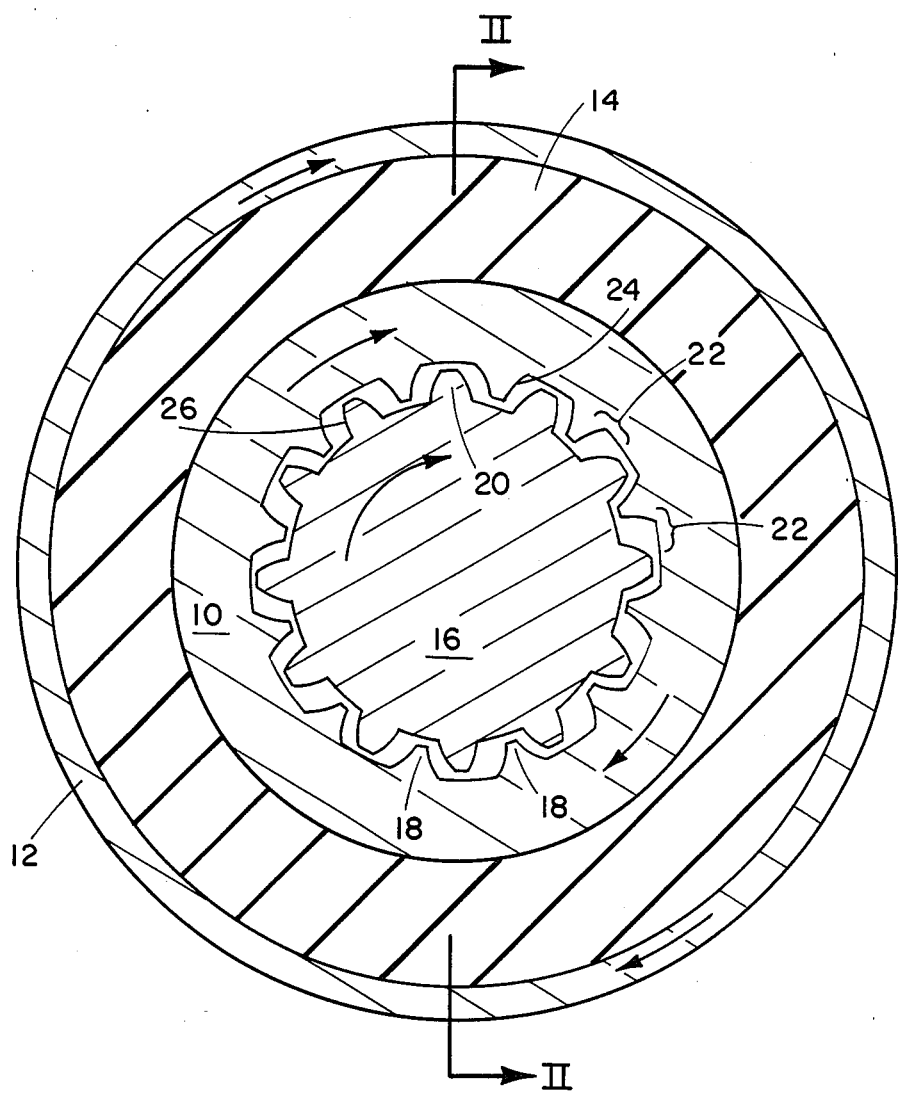
FIG. 1 shows a cross-sectional view of the first and second rotatable members of the present invention with a compliant connecting means disposed therebetween.

FIG. 1 shows a cross-sectional view of the present invention. A first rotatable member 10 is connected to a second rotatable member 12 by a compliant connecting means 14 which is disposed radially, in a preferred embodiment of the present invention, between the first 10 and second 12 rotatable members. The compliant connecting means 14 is connected to both the first 10 and second 12 rotatable members for the purpose of transmitting torque therebetween. The first rotatable member 10 is also provided with a plurality of teeth 18 which combine to form a first spline member. A portion 16 of the second rotatable member 12 is also provided with a plurality of teeth 20 which are disposed in the interstices between the teeth 18 of the first rotatable member as shown in FIG. 1.

It should be understood that the present invention can be configured to connect the first rotatable member to a driving shaft and the second rotatable member to a driven shaft or, alternatively, the first rotatable member can be connected to the driven shaft with the second rotatable member being connected to the driving shaft. In this example, illustrated in FIG. 1, the first rotatable member 10 will be described as being the driving member, or shaft, which is configured to be rotated, by some prime mover, in the rotational direction indicated by the arrow that is associated with the first rotatable member 10.

When the first rotatable member 10 rotates in the direction indicated by its arrow, torque is transmitted through the compliant member 14 to the second rotatable member 12 and this compliant connection causes the second rotatable member 12 to rotate in the direction indicated by its associated arrow. It should be apparent from FIG. 1 that the first and second spline members are associated together in such a way that no torque is transmitted between the teeth 18 of the first rotatable member and the teeth 20 which are connected to a portion 16 of the second rotatable member 12. This non-torque transmitting relationship is caused by the fact that a space 22 exists between the driving face 24 of each of the teeth 18 and the driven face 26 of each of the teeth 20. Therefore, in this configuration shown in FIG. 1, all of the torque is transmitted between the first rotatable member 10 and the second rotatable member 12 solely by the compliant connecting means 14.

As the torque transmitted by the present invention increases, deformation will occur within the compliant connecting means 14. This deformation of the compliant connecting means 14 will permit a slight amount of relative rotation to occur between the first 10 and second 12 rotatable members. As this relative rotation occurs, the teeth 18 of the first spline member will move relative to the teeth 20 of the second spline member. As this movement occurs between the teeth of the first and second spline members, the driving face 24 of the teeth 18 will move toward the driven face 26 of the teeth 20. Therefore, the space 22 between the driving 24 and driven 26 faces of these teeth will decrease. Eventually, when the torque between the first rotatable member 10 and the second rotatable member 12 reaches a predetermined magnitude, the driving faces 24 of the teeth 18 will move into contact with the driven faces 26 of the teeth 20 and torque can be transmitted from the first rotatable member 10 to the portion 16 of the second rotatable member 12 through the teeth, 18 and 20, of the first and second spline members. When the teeth 18 move into contact with the teeth 20, it should be understood that torque will be transmitted between the first and second rotatable members by two means. Some of the torque will be transmitted by the compliant connecting means 14 and the remainder of the torque will be transmitted through the spline arrangement disposed between the first rotatable member 10 and the portion 16 of the second rotatable member 12.

By appropriately selecting the material, size and shape of the compliant member 14, the torque which causes the first spline member to move into contact with the second spline member can be preselected. Therefore, a coupling can be devised which provides torque through the compliant member 14 at magnitudes of torque below a predefined value and, for magnitudes of torque above that predefined value, torque can be transmitted through the spline arrangement in cooperation with the compliant member 14.

The use of the compliant connecting means 14 provides at least two significant benefits. First, the compliant connecting means 14 inhibits the transmission of noise between the first and second rotatable members. This is significantly advantageous in applications where quiet operation is important. A second benefit that results from the use of the compliant connecting means 14 is that the first and second rotatable members can be provided with a degree of articulation as will be described in greater detail below.

Figure 2:
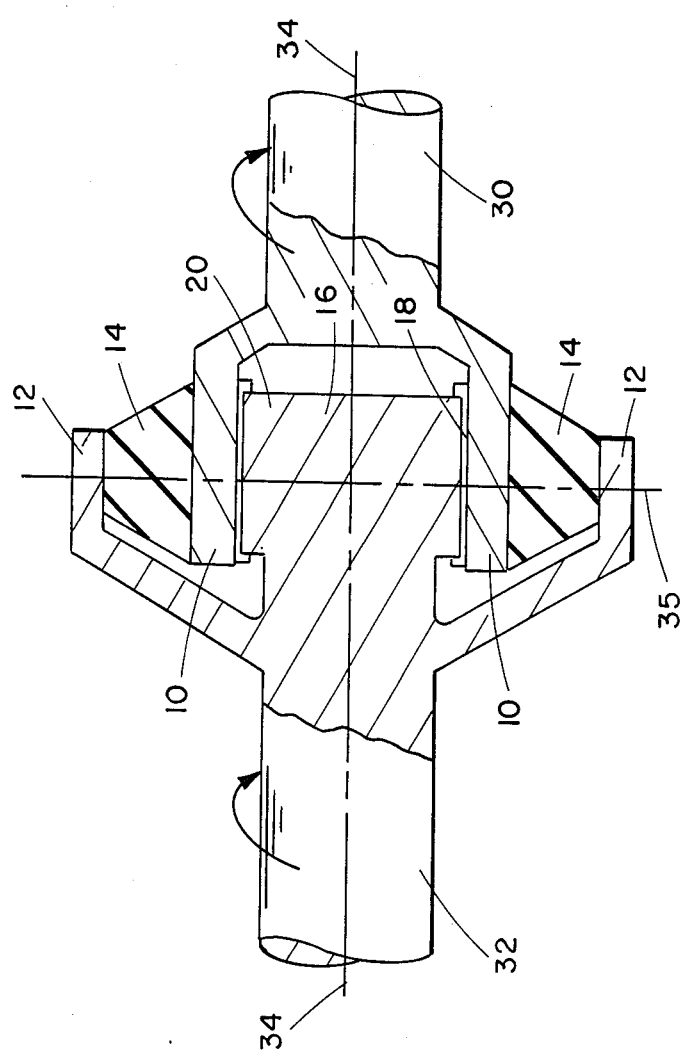
FIG. 2 shows a side sectional view of the present invention with the first and second rotatable members aligned coaxially with each other.

FIG. 2 shows a side sectional view of the present invention. A first rotatable member 10 is shown disposed in association with a second rotatable member 12 which has a portion 16. In FIG. 2, the first rotatable member 10 is shown connected to a drive shaft 30 and the second rotatable member 12 is shown connected to a driven shaft 32. In a preferred embodiment of the present invention, the compliant connecting means 14 is disposed radially between the first 10 and second 12 rotatable members. However, it should be understood that, in alternative embodiments of the present invention the compliant connecting means could be disposed in other positions relative to the first and second rotatable members. The compliant connecting means 14 is connected to both the first and second rotatable members, as shown in FIG. 2, for the purpose of transmitting torque between the first and second rotatable members.

A portion 16 of the second rotatable member 12 is disposed in association with the first rotatable member 10 for the purpose of providing a spline connection between these two devices. This portion 16 of the second rotatable member 12 is provided with a plurality of teeth 20 around the periphery of the portion 16 as shown in FIG. 2. Similarly, the first rotatable member 10 is provided with a plurality of teeth 18 that are associated with the teeth 20 described above. In a typical arrangement, each of the teeth 18 of the first spline member are disposed between a pair of adjacent teeth 20 of the second spline member. Although not specifically shown in FIG. 2, it should be understood that a space 22 exists between the driving faces 24 of the teeth 18 and the driven faces 26 of the teeth 20, as shown in FIG. 1 and described above.

As illustrated in FIG. 2, the driving shaft 30 and the driven shaft 32 are disposed to rotate about a common axis of rotation 34. When disposed in this manner, the first 10 and second 12 rotatable members will also rotate about a common axis of rotation. As illustrated in FIG. 2, the spline arrangement which comprises the teeth, 18 and 20, is disposed in general axial alignment with the compliant connecting means 14. Line 35 shows the common axial position of the compliant connecting means 14 and the spline arrangement. Therefore, both the compliant connecting means 14 and the spline connection apparatus between the first and second rotatable members are axially aligned with each other. This general axial alignment between these components permits a degree of articulation to exist between the first 10 and second 12 rotatable members of the present invention. This characteristic is more specifically described below in conjunction with FIG. 3.

Figure 3:
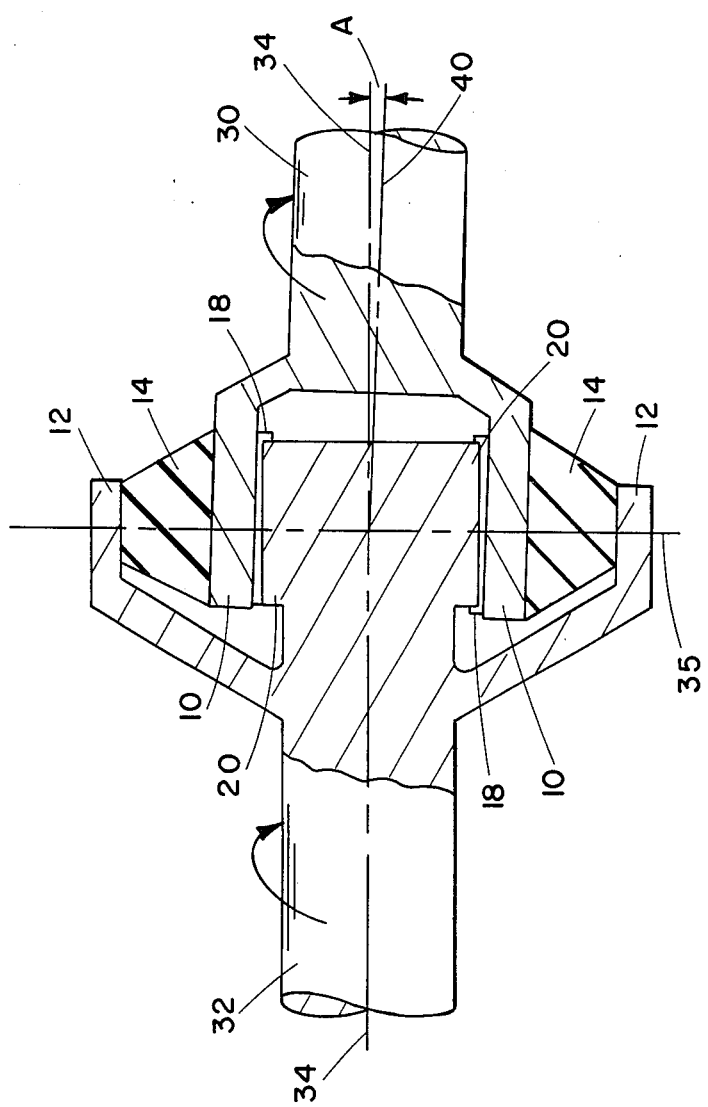
FIG. 3 illustrates the present invention arranged with its first and second rotatable members articulated so that the axes of rotation of these two rotatable members are non-coaxial with each other.

FIG. 3 illustrates the components shown in FIG. 2 in a configuration in which the first 10 and second 12 rotatable members are associated in a non-coaxial configuration. As can be seen in FIG. 3, the driven shaft 32 which is connected to the second rotatable member 12 is rotating about the axis of rotation 34 which was described above and illustrated in FIG. 2. However, the driving shaft 30, which is connected to the first rotatable member 10, is rotating about another axis of rotation 40 which is not coaxial with the axis of rotation 34 of the driven shaft 32. The magnitude of articulation between the driving 30 and driven 32 shafts is indicated in FIG. 3 by angle A between the two axes of rotation, 34 and 40.

Because of the axial alignment between the compliant connecting means 14 and the spline apparatus, which compriese the teeth 18 and 20, shown by line 35, this type of articulation is made possible. The compliant connecting means 14 deforms to permit the change in alignment between the first and second rotatable members. The teeth, 18 and 20, of the first and second spline members are not rigidly connected to each other and, therefore, also permit this movement. Because of the compliant nature of the compliant connecting means 14, torque can continue to be transmitted between the first and second rotatable members during this articulated arrangement. The ability to provide this type of articulation between a driving shaft and a driven shaft is important in applications in which one of the shafts is connected to a device that is flexibly mounted. For example, the illustration of FIG. 3 shows a typical situation in which the driven shaft 32 is more rigidly confined to an axis of rotation 34 by some means, such as bearings, which are associated with generally rigid components. On the other hand, the driving shaft 30 is permitted to move to a position which causes it to rotate about an axis of rotation 40 that is not coaxial with the axis of rotation 34, as indicated by the angular deflection A between these two axes of rotation, 34 and 40. This could result from a prime mover, such as an engine, that is mounted on flexible components such as a shock mounting configuration. The present invention permits this type of association between shafts because of the degree of articulation permitted by the axial alignment, shown by line 35, between the compliant connecting means 14 and the first and second spline members.

As described above in conjunction with FIG. 1, the present invention is intended to transmit torque between the first and second rotatable members entirely through the compliant connecting means 14 when the torque between the first and second rotatable members is less than a predefined magnitude. When the torque rises above that predetermined magnitude, the first and second spline members move into contact relation with each other to transmit a portion of the total torque that exists between the first and second rotatable members. At all magnitudes of torque above that predefined magnitude, the torque transmission is shared between the spline arrangement and the compliant connecting means 14. This transition, from the torque transmission being provided solely by the compliant connecting means 14 to a combined torque transmission in which the spline arrangement shares a portion of the load, permits the present invention to transmit torque in a quiet manner with noise transmission being inhibited by the compliant connecting means 14 at magnitudes of torque below the predetermined magnitude while providing a more rigid, but possibly noisier, means for transmitting torque at magnitudes of torque above the predefined magnitude. It should also be apparent that the spline arrangement described above also will move into torque transmitting contact between the first and second spline members in the event that a failure occurs within the compliant connecting means 14. Therefore, the spline teeth, 18 and 20, provide a backup torque transmission path not only during periods of high torque, but also if the compliant connecting means fails.

Figure 4:
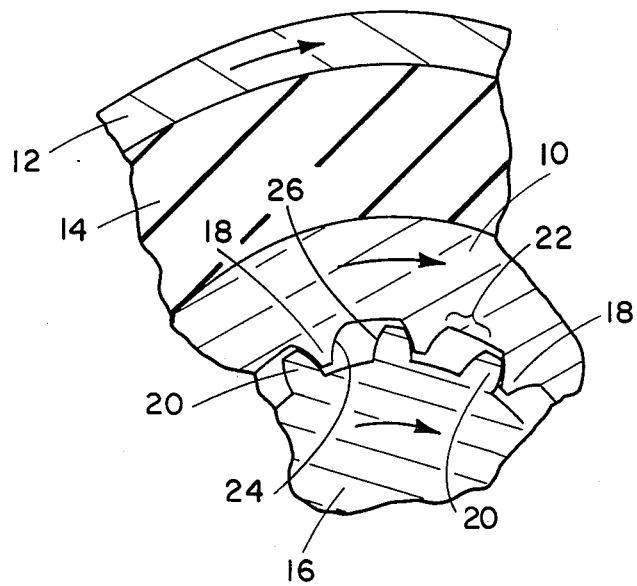
FIG. 4 illustrates a portion of the device shown in FIG. 1.
Figure 5:
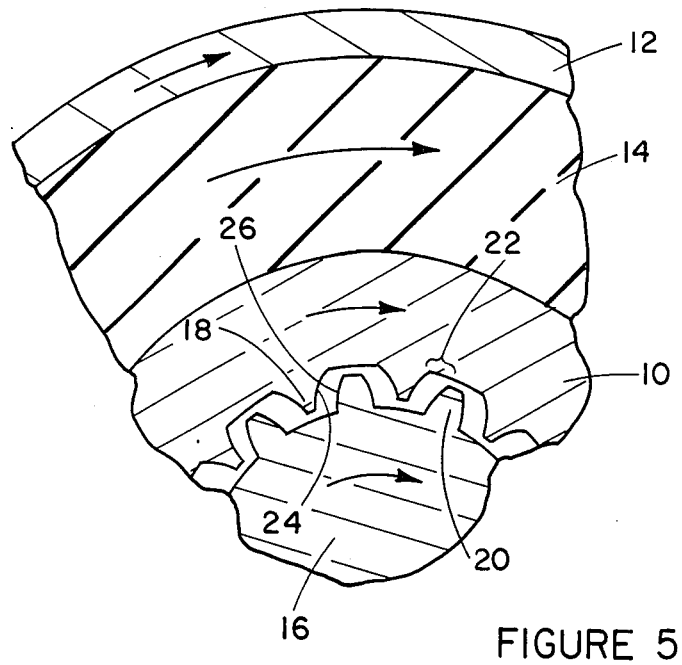
FIG. 5 illustrates the portion of the device of FIG. 1 which is shown in FIG. 4, but with a relative rotational movement between the first and second rotatable members of the present invention.

FIGS. 4 and 5 combine to illustrate the sequential operation of the present invention in greater detail than that which is shown in FIG. 1. FIG. 4 shows the present invention during operation where the torque transmitted between the first and second rotatable members is less than the predefined magnitude of torque at which the spline members are expected to share a portion of the torque transmitting load. In this type of situation, all of the torque is transmitted from the first rotatable member 10 to the second rotatable member 12 through the compliant connecting means 14 which is attached to both of these rotatable members. The arrows in FIG. 4 show the direction of rotation of both of the rotatable members. As can be seen in FIG. 4, the teeth 18 of the first spline member are in non-torque transmitting relation with the teeth 20 of the second spline member and the driving faces 24 of the teeth 18 are in non-torque transmitting relation with the driven faces 26 of the teeth 20. The portion 16 of the second rotatable member 12 is caused to move in the direction of the arrow only because of the physical connection between these components, as shown in FIGS. 2 and 3. In other words, the portion 16 of the second rotatable member is caused to move because of the transmission of torque from the first rotatable member 10, through the compliant connecting means 14 to the second rotatable member 12 which is attached, as illustrated in FIGS. 2 and 3, to the portion 16 of the second rotatable member 12. Therefore, FIG. 4 illustrates a condition in which all of the torque is transmitted from the first rotatable member 10 to the second rotatable member 12 through the compliant connecting means 14.

FIG. 5 shows the present invention under conditions in which the torque being transmitted from the first rotatable member to the second rotatable member is approaching the predefined magnitude of torque at which the spline arrangement is expected to share a portion of the load. As the torque being transmitted from the first rotatable member 10 to the second rotatable member 12 approaches this predefined magnitude, the compliant connecting means 14 will begin to deform and permit relative rotation to occur between the first 10 and second 12 rotatable members. Since the portion 16 of the second rotatable member is rigidly connected to the second rotatable member 12, as illustrated in FIGS. 2 and 3 and described above, this relative rotation between the first and second rotatable members will cause the teeth 18 of the first spline member to move relative to the teeth 20 of the second spline member. This condition is illustrated in FIG. 5. As this relative rotation occurs, the driving faces 24 of the teeth 18 will begin to move toward the driven faces 26 of the teeth 20. As the torque being transmitted increases, these faces, 24 and 26, will eventually move into contact with each other and torque will be transmitted through this contact from the first rotatable member 10 to the portion 16 of the second rotatable member 12. At torques above the predefined magnitude, the spline arrangement will continue to share a portion of the torque transmission load. However, it should be understood that during all phases of operation, a portion of the load is transmitted through the compliant connecting means 14. It should also be understood that, in FIG. 5, the teeth 18 are shown as remaining in non-contact and non-torque transmitting relation with the teeth 20. Eventually, as the first rotatable member 10 continues to rotate relative to the portion 16 of the second rotatable member 12, the space 22 between the driving faces 24 and driven faces 26 will continue to decrease and, eventually, the teeth 18 will move into contact with the teeth 20 to provide a torque transmission between the first rotatable member 10 and the portion 16 of the second rotatable member 12. At all magnitudes of torque above the predefined magnitude, the torque transmitting function of the present invention will be shared between the spline arrangement and the compliant connecting means 14. However, it should also be understood that the spline arrangement will move into torque transmitting relation at any time when the compliant connecting means 14 fails.

Referring again to FIG. 3, it should be noted that the teeth, 18 and 20, of the first and second spline members are shown as being generally rectangular in cross-section. This representation is one of many possible tooth configurations that can be used in accordance with the present invention. However, it should be apparent that some accommodation must be provided to avoid interferring with the articulation of the subject invention as illustrated in FIG. 3. This accommodation can be provided by utilizing a radial gap between the distal edges of the spline teeth and the root portion of the associated teeth as shown in FIG. 1, 4 and 5. Alternatively, the spline teeth can be provided with a crown wherein the axial ends of the teeth are shaped to have reduced radial dimension. The use of crowned spline teeth will prevent interferrence between the distal edges of the spline teeth with the root portions of their associated teeth of the other spline member. It should be understood that, the specific shape of the spline teeth is not critical to the operation of the present invention and that various types of tooth accommodation are possible to permit articulation within the scope of the present invention. The articulation of the present invention is provided by the compliant connecting means 14 and the general axial alignment, as indicated by line 35, between the compliant connecting means 14 and the teeth, 18 and 20, of the spline members. As long as the spline teeth do not interfere with this articulation ability, virtually any type of spline arrangement can be utilized in conjunction with the present invention.

Although the invention has been described with particular detail and specificity, it should be understood that alternative embodiments are possible within the scope of the present invention.

What I claim is:

1. A shaft coupling, comprising:
  a first rotatable member having a first axis of rotation, said first rotatable member having a first portion being generally coaxial with said first axis of rotation, said first portion of said first rotatable member being generally annular in shape;
  a second rotatable member having a second axis of rotation, said second rotatable member having a first portion and a second portion, said first and second portions of said second rotatable member being generally coaxial with said second axis of rotation, said second portion of said second rotatable member being disposed radially outward from said first portion of said second rotatable member, said second portion being generally annular in shape, said first portion of said first rotatable member being disposed radially between said first and second portions of said second rotatable member;
  compliant means for connecting said first and second rotatable members together, said compliant connecting means being configured to transmit torque between said first and second rotatable members, said compliant connecting means being disposed radially between said first portion of said first rotatable member and said second portion of said second rotatable member, said compliant connecting means being generally annular in shape and being connected to both said first portion of said first rotatable member and said second portion of said second rotatable member, said compliant connecting means being deformable to permit relative rotation between said first and second rotatable members;
  a first spline member connected to said first rotatable member, said first spline member being attached to said first portion of said first rotatable member, said first spline member having a plurality of teeth extending radially inward from said first portion of said first rotatable member, said compliant connecting means being disposed radially outward from said first spline member, said compliant connecting means being made of an elastomeric material; and
  a second spline member, connected to said second rotatable member, said second spline member being attached to said first portion of said second rotatable member, said second spline member having a plurality of teeth extending radially outward from said first portion of said second rotatable member said first and second spline members being associated in a non-torque transmitting relation with said plurality of teeth of said first spline member being disposed in the interstices of said plurality of teeth of said second spline member, said teeth of said first spline member being movable into contact with said teeth of said second spline member when said compliant connecting means deforms in response to a relative rotation between said first rotatable member and said second rotatable member, said compliant connecting means being generally disposed in axial alignment with said first and second spline members.

2. The shaft coupling of claim 1, wherein:
  said first axis of rotation is movable into non-coaxial relation with said second axis of rotation, said compliant connecting means being deformable to permit transmission of torque between said first and second rotatable members when said non-coxial relationship exists.

3. The shaft coupling of claim 1, wherein:
  said compliant connecting means is selected to permit said first spline member to move into torque transmitting relation with said second spline member upon the occurrence of a preselected magnitude of torque between said first and second rotatable members.

4. A torque transmitting apparatus, comprising:
  a first rotatable member having a first axis of rotation, said first rotatable member having a first portion, said first portion of said first rotatable member being generally annular in shape and being generally coaxial with said first axis of rotation;
  a second rotatable member having a second axis of rotation, said second rotatable member having a first and a second portion, said first and second portions of said second rotatable member being generally coaxial with each other and with said second axis of rotation, said second portion of said second rotatable member being generally annular in shape and being disposed radially outward from said first portion of said second rotatable member, said first portion of said first rotatable member being disposed radially between said first and second portions of said second rotatable member;
  compliant means for connecting said first rotatable member to said second rotatable member, said compliant connecting means being generally annular in shape and being disposed radially between said first portion of said first rotatable member and said second portion of said second rotatable member, said compliant connecting means being attached to a radially inner surface of said second portion of said second rotatable member and to a radially outer surface of said first portion of said first rotatable member, said compliant connecting means being deformable to permit relative rotation between said first and second rotatable members, said compliant connecting means being disposed radially outward from said first portion of said first rotatable member and said first portion of said second rotatable member, said compliant connecting means being made of an elastomeric material, said compliant connecting means being arranged to transmit torque between said first and second rotatable members;

a first pluraity of teeth connected to said first rotatable member, said first plurality of teeth being attached to said first portion of said first rotatable member, said first plurality of teeth extending in a radially inward direction from said first portion of said first rotatable member; and a second plurality of teeth connected to said second rotatable member, said second plurality of teeth being attached to said first portion of said second rotatable member and extending in a radially outward direction from said first portion of said second rotatable member, said first and second pluralities of teeth being arranged with each of said first plurality of teeth being disposed between a preselected pair of adjacent ones of said second plurality of teeth, said first plurality of teeth being movable into torque transmitting relation with said second plurality of teeth when said first rotatable member moves rotationally relative to said second rotatable member, said first and second plurality of teeth being disposed in axial alignment with said compliant connecting means.

5. The apparatus of claim 4, wherein:
said compliant connecting means is made of an elastomeric material.

6. The apparatus of claim 4, wherein:
said first and second rotatable members are disposable in non-coaxial torque transmitting association with each other.

7. The apparatus of claim 6, wherein:
said compliant connecting means is selected to permit said first and second pluralities of teeth to move into torque transmitting relation with each other upon the occurrence of a predetermined magnitude of torque between said first and second rotatable members.

* * * * *